United States Patent [19]

Matchett

[11] 3,928,714

[45] Dec. 23, 1975

[54] SIMULTANEOUS OIL AND ELECTRIC TRANSMISSION SYSTEM AND METHOD FOR FABRICATING SAME

[76] Inventor: Walter E. Matchett, R.R. No. 6, Portland, Ind. 47371

[22] Filed: June 5, 1974

[21] Appl. No.: 476,592

Related U.S. Application Data

[63] Continuation-in-part of Ser. No. 399,848, Sept. 24, 1973, abandoned.

[52] U.S. Cl. .................. 174/47; 29/428; 29/592; 138/108; 156/54; 174/27; 174/99 R; 174/146; 248/68 R
[51] Int. Cl.² .................. H02G 9/00; H02G 1/00
[58] Field of Search ............ 174/24, 27, 28, 37, 47, 174/99 R, 99 B, 100, 146; 138/105, 108, 112, 113, 114, 148, 172; 248/49, 68 R, 74 R, 74 B; 29/592, 624, 628, 428, 469, 202.5, 203 C

[56] References Cited

UNITED STATES PATENTS

| | | | |
|---|---|---|---|
| 1,611,438 | 12/1926 | Hauser | 138/113 |
| 2,288,821 | 7/1942 | Matchett | 174/27 |
| 2,453,319 | 11/1948 | Hollyday, Jr. | 174/146 UX |
| 2,991,807 | 7/1961 | Turner | 174/99 R X |
| 3,436,287 | 4/1969 | Windeler | 156/54 |
| 3,530,634 | 9/1970 | Adams | 174/146 UX |
| 3,775,550 | 11/1973 | Olsen | 174/27 |

*Primary Examiner*—Laramie E. Askin

[57] ABSTRACT

A pipeline and conductor assembly is provided for the simultaneous transmission of oil and electrical power or electrical communication signals; and a method is provided for the production of the pipeline and conductor assembly.

The pipeline and conductor assembly includes an elongated conduit of formed sheet construction, a plurality of dielectric conductorsupporting rods being transversely located at spaced intervals in the conduit, and a plurality of conductors being longitudinally disposed in the conduit in spaced parallel relationship to the inner walls thereof and being attached to the supporting rods.

The method includes: welding rod-supporting brackets onto one surface of an elongated rectangular sheet of material, forming the rectangular sheet of material into a U-shaped structure, attaching conductor-supporting rods to the brackets, placing a plurality of conductors in the structure in spaced parallel relationship to each other and to the walls of the structure, securing the conductors to the rods, forming the structure into a closed conduit with edges of the rectangular sheet abutted together, and welding the abutting edges.

10 Claims, 8 Drawing Figures

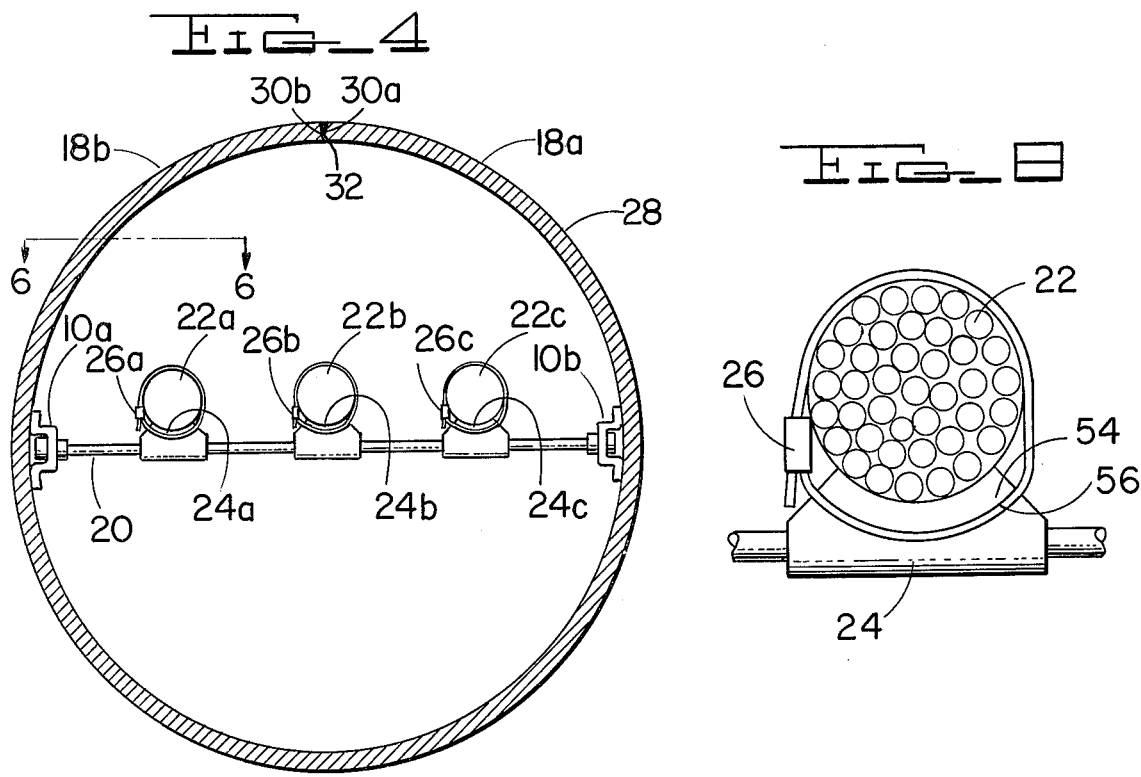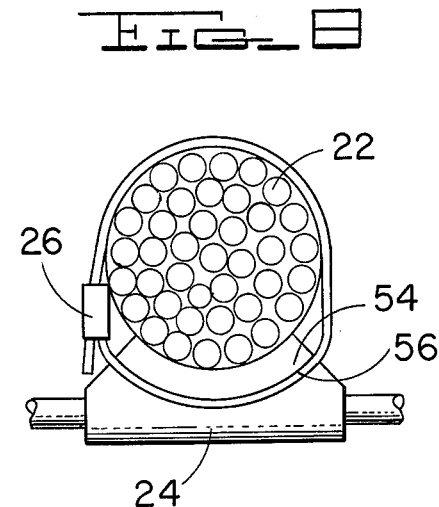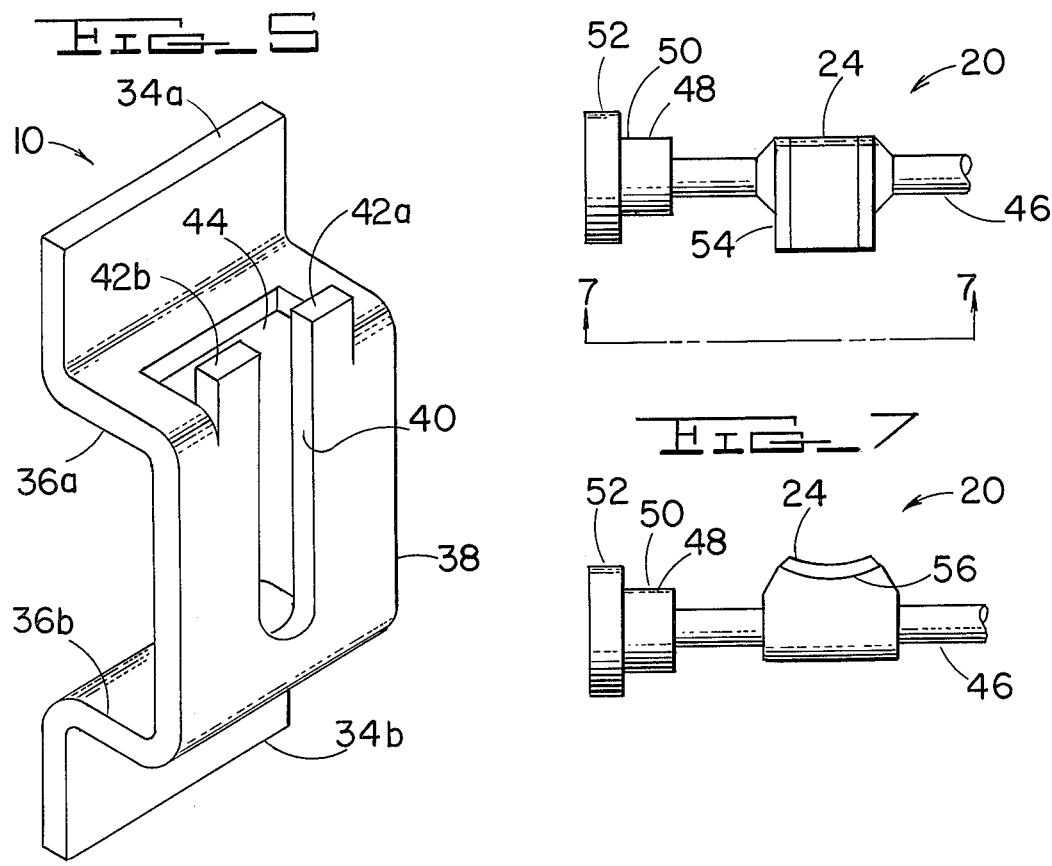

3,928,714

SIMULTANEOUS OIL AND ELECTRIC TRANSMISSION SYSTEM AND METHOD FOR FABRICATING SAME

CROSS-REFERENCE TO RELATED APPLICATION

This is a continuation-in-part of my parent application Ser. No. 399,848 filed Sept. 24, 1973, now abandoned.

BACKGROUND OF THE INVENTION

1. Field of the Invention

This invention relates generally to pipelines for the transmission of petroleum fluids and more particularly to a pipeline and conductor assembly for the simultaneous transmission of oil and electrical power or electrical communication signals, the invention including both the pipeline and conductor assembly and the method of manufacture.

2. Description of the Prior Art

In my U.S. Pat. No. 2,288,821, there is disclosed an underground conduit for electrical transmission lines. This underground conduit utilizes petroleum oil or other suitable fluidic dielectric material for an insulating fluid so that bare-conductor high voltage transmission lines may be spaced in close proximity to each other in the conduit, but which would not permit the transmission of significant amounts of oil because of the resistance to the flow by the conductor-supporting insulator assemblies.

In my present invention, a pipeline and conductor assembly is provided which utilizes the dielectric properties of material being transported, that is, petroleum fluid, to provide insulation for high voltage electric transmission conduits. My present invention permits simultaneous transmission of great quantities of crude or semirefined oil and large wattages of electrical power.

My present invention utilizes the interior environment of the pipeline for the physical supporting and physical protection of the transmission lines. It utilizes the dielectric properties of the fluid being transported to insulate the transmission lines thereby allowing the transmission lines to be bare conductors in close spaced relationship to each other. In addition it utilizes the power loss of the electrical transmission lines to heat the oil thereby reducing the viscosity of the oil and reducing the power that is required to transport the petroleum fluid. This is of major importance in arctic regions where extreme low ambient temperatures require that the oil be heated by some means.

SUMMARY OF THE INVENTION

In accordance with the broader aspects of this invention, there is provided a pipeline and conductor assembly and the method of fabrication thereof.

The pipeline and conductor assembly includes an elongated conduit of formed sheet construction having a closed cross section, a plurality of rod-supporting brackets being attached to the inside of the conduit on oppositely opposing inner walls thereof and forming longitudinally spaced pairs of brackets, a plurality of conductor-supporting rods each having the opposite ends thereof attached to one pair of rod-supporting brackets, and a plurality of conductors being longitudinally disposed in the conduit in spaced parallel relationship to the inner walls of the conduit and being attached to the supporting rods.

The method of fabrication of the pipeline and conductor assembly includes: welding pairs of supporting brackets to one surface of the rectangular sheet with each pair spaced longitudinally from another pair and with each bracket of a pair spaced transversely from the other bracket of the same pair at a distance wherein each pair of the brackets will be spaced diametrically opposite to each other when the sheet is finished into a circular conduit, forming the rectangular sheet of material into a U-shaped structure with the axis of the structure parallel to the length of the sheet, attaching conductor-supporting rods between each pair of brackets, placing a plurality of conductors in the structure in spaced parallel relationship to each other and to the axis of the structure, securing each conductor to each conductor-supporting rod, forming the structure into a closed conduit with the elongated edges of the sheet abutting each other, and welding the abutting edges.

It is an object of this invention to provide a pipeline and conduit assembly for the simultaneous transmission of petroleum fluid and either electrical power or electrical communication signals.

It is another object of this invention to provide a method for the fabrication of a pipeline and conductor assembly.

It is still another object of this invention to provide a pipeline having transversely oriented conductor-supporting rods of dielectric material and longitudinally oriented conductors secured to the dielectric supporting rods.

It is still another object of this invention to provide a method for the fabrication of a pipeline and conductor assembly at the installation site. The method includes welding rod-supporting brackets to one surface of an elongated sheet of material, forming the sheet of material into a U-shaped structure, installing transverse supporting rods and longitudinal conductors, and completing the conduit by forming the sheet into a closed conduit and welding the abutting seams.

The above-mentioned and other features and objects of this invention and the manner of obtaining them will become more apparent and the invention itself will be best understood by reference to the following description of an embodiment of the invention taken in conjunction with the accompanying drawings.

BRIEF DESCRIPTION OF THE DRAWINGS

In the drawings:

FIG. 4 is a cross section of the completed pipeline and conductor assembly;

FIG. 5 is a perspective view of one of the rod-supporting brackets;

FIG. 6 is a partial top view of one of the conductor-supporting rods taken as shown by view line 6—6 of FIG. 4, showing one flanged end connector and one conductor-supporting saddle;

FIG. 7 is the front view of the conductor-supporting rod of FIG. 6, taken as shown by view line 7—7 of FIG. 6;

FIG. 8 is a partial and enlarged view of the pipeline and conductor assembly of FIG. 4, showing one conductor in cross section, one conductor-supporting saddle, and the clamp which is used to attach the conductor to the conductor-supporting saddle.

DESCRIPTION OF THE PREFERRED EMBODIMENT

Figure 1:
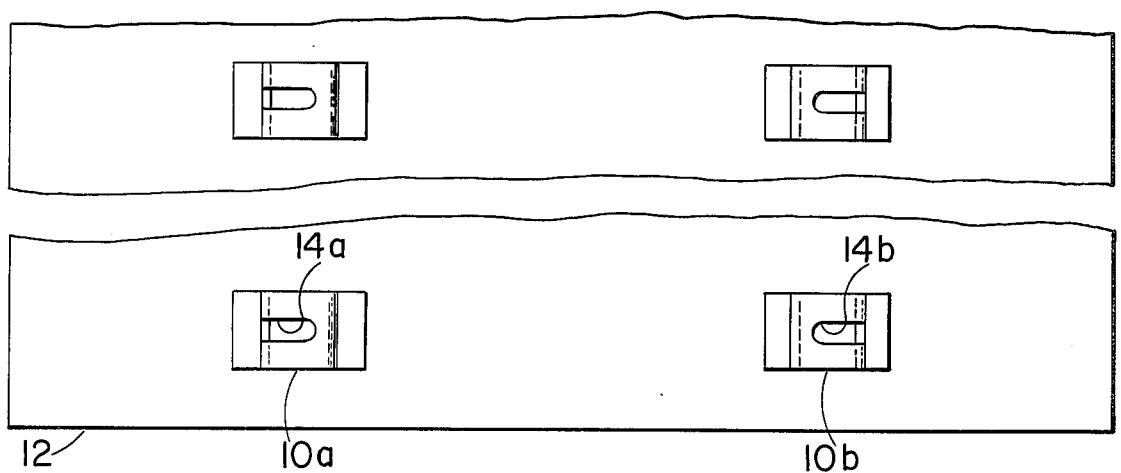
FIG. 1 is a partial and broken plan view of the elongated rectangular sheet of material with the rod-supporting brackets welded thereon.
Figure 2:
FIG. 2 is an end view of FIG. 1.

Referring now to FIGS. 1 and 2, pairs of rod-supporting brackets 10a and 10b are welded to one surface of an elongated rectangular sheet 12 with rod end receiving slots 14a and 14b being oriented toward their respective proximal edges of the sheet. The brackets 10 are spaced in from their respective edges of the sheet by one fourth the width of the sheet; so that, when the rectangular sheet 12 is formed into a circular conduit, the brackets 10 will be on opposite diametrical sides of the inside surface of the conduit with the slots 14 opening toward the same side of the conduit. The pairs of brackets 10 are spaced longitudinally as required for adequately supporting the electrical conductors, depending upon the weight and rigidity of the electrical conductors which are to be used.

Figure 3:
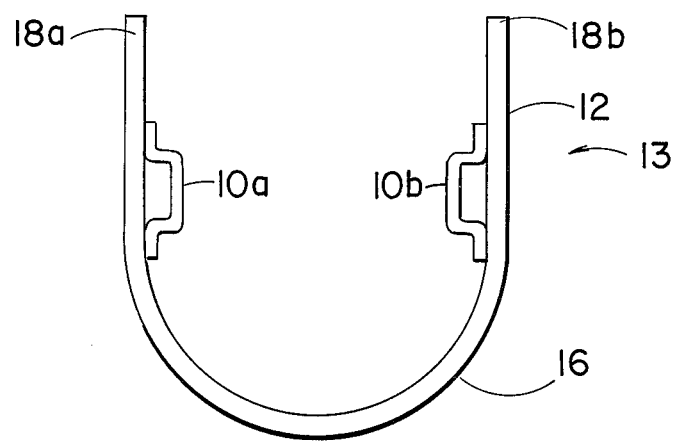
FIG. 3 is an end view of the rectangular sheet after the rectangular sheet has been formed into a U-shaped structure, the rod-supporting brackets now being located on opposite inner surfaces of the structure.

Referring now to FIG. 3, the rectangular sheet 12 has been formed into a U-shaped structure 13 consisting of a trough portion 16 which is of semicircular cross section and a pair of upstanding edges 18a and 18b which provide material for forming of the other semicircular portion of the conduit. Notice that the brackets 10 are now located vertically so that they are on a diametrical centerline of the completed conduit. Notice also that the slots 14 now open upwardly, as can be seen from their orientation in FIG. 1.

Referring now to FIG. 4, a plurality of conductor-supporting rods 20 have each been attached between a pair of the brackets 10, a plurality of conductors 22 have been placed onto one of a plurality of conductor-supporting saddles 24, and a plurality of clamps 26 have been used to clamp one of the conductors 22 onto one of the conductor-supporting saddles 24. Then, subsequent to the installation of the conductor-supporting rods 20, the conductors 22, and the clamps 26, the upstanding edges 18a and 18b of FIG. 3 have been formed to complete a closed conduit 28, and proximal and abutting edges 30a and 30b have been attached by a weld 32.

Referring now to FIG. 5, one of the rod-supporting brackets 10 is shown in greater detail. The rod-supporting bracket 10 includes a generally hat-shaped channel structure having a pair of outwardly extending flanges 34 a and 34 b, a pair of upstanding webs 36a and 36b, a rod-attaching plate or slotted plate means 38 which includes a rod-attaching aperture or rod end receiving slot 40, a pair of locking tabs or locking tab means 42a and 42b.

It can be seen from the FIG. 5 illustration that the locking tabs 42a and 42b are formed from a portion of the web 36a and that the formation of the tabs 42a and 42b leaves a slot 44 in the web 36a which is of greater width than the slot 40; so that the slots 40 and 44 cooperate to form a T-shaped slot.

Referring now to FIGS. 5, 6, and 7, but primarily to FIGS. 6 and 7, the conductor-supporting rods 20 which may be either flexible or rigid, include a rod portion 46 which is preferably of a dielectric material such as fiberglass or nylon, a flanged end connector 48 which includes both a hub portion 50 and a flanged portion 52 and which is preferably molded of suitable plastic or metal onto the end of the rod portion 46, and the conductor-supporting saddle 24 which is preferably of a dielectric material and which is preferably molded onto the rod portion 46. The conductor-supporting saddle 24 includes an extended supporting and clamping portion 54 which provides a surface 56 for the application of the clamp 26. If flexible, the rod may be formed of flexible strands of glass fiber or nylon woven into the form of a rope or cord. The word "rod" as used herein is intended to include both rigid and flexible structures.

The hub portion 50 is of a diameter or width such that it is slidably receivable into the slot 40. The flanged portion 52 is of such a diameter or width and is of such a thickness that it is slidably receivable into the slot 44. After attaching the flanged end connectors 48 to the rod-supporting brackets 10 by inserting the flanged portions 52 into the slots 44 and the hub portions 50 into the slots 40, the locking tabs 42a and 42b are bent down into substantially parallel alignment with the web 36a thereby reducing the width of the slot 44 to the width of the slot 40 and thereby preventing the removal of the flanged portion 52 from the rod-supporting bracket 10.

Referring now to FIG. 8, the conductor 22 is shown in cross section in position on the conductor-supporting saddle 24 with the strap metal clamp 26 securely binding the conductor 22 to the extended supporting and clamping portion 54 of the conductor-supporting saddle 24. It should be understood that the clamp 26 can be of any suitable construction or type.

To form pipeline and conductor assemblies of extended lengths, an assembly is constructed as has been described, using conductors of a length considerably greater than the length of the sheet 12. Then, after completing one section of the pipeline and conductor assembly, a U-shaped subassembly, as shown in FIG. 3, is abutted against the end of the completed section, the conductor-supporting rods 20 are installed, the conductors 22 are extended over the rods 20 and fastened thereto, the upstanding edges 18a and 18b of the new section are formed inwardly and downwardly to form a circular closed section, the abutting edges 30a and 30b are welded, and the new section of pipeline and conductor assembly is welded to the first section.

Recapitulating, the enlongated rectangular sheets are preferably of soft annealed steel of a width as described, of a thickness sufficient to withstand the high pressures necessary for the efficient operation of the system and of a length most practical to transport to the construction site. The sheets are placed end to end and are welded together to form a continuous strip of indefinite length, perhaps as long as a thousand miles or more, depending on the terrain.

Suitable machinery forms the sheet, or strip with the brackets 10a and 10b already welded in their proper positions, into the trough-like formation shown in FIG. 3. The conductor supporting rods which have been pre-fabricated to include the conductor supporting saddles 24a, b, c and the ends 48, 50, and 52 are then placed in position in the brackets and secured. Other machinery which carries the reels of conductor cable then follows, laying down the conductor cables in their respective saddles. No joints in the conductor cables will be necessary except at the ends of reels. The conductors are then secured to their respective saddles by clamps 26. Additional machinery follows and forms the trough into a circular pipe, which is then completed by welding.

It should be further understood that, while the transmission of high wattages of electrical power have been given primary consideration in the description, bundles of telephone line conduits or microwave guide tubes can also enjoy the environmental protection of being enclosed in the pipeline of this invention; and the word "conductor" as used herein encompasses such conductors.

While there have been described above the principles of this invention in connection with specific apparatus, it is to be clearly understood that this description is made only by way of example and not as a limitation to the scope of the invention.

What is claimed is:

1. A method of fabricating a pipeline and conductor assembly comprising the steps of:
   a. forming an elongated rectangular sheet of material into a U-shaped structure comprising a trough portion and a pair of upstanding flanges with the axis of said trough portion parallel to the length of said sheet;
   b. placing a conductor in said trough portion in parallel relationship to said axis;
   c. securing said conductor to said trough portion in spaced parallel relationship to the bottom and to said sides of said trough portion;
   d. forming said U-shaped structure into a closed conduit with the elongated edges of said sheet proximal to each other;
   e. attaching longitudinally spaced and transversely oriented conductor-supporting rods between opposite sides of said U-shaped structure prior to said placing operation;
   f. attaching said conductor to said rods subsequent to said placing operation;
   g. attaching pairs of rod-supporting brackets to one surface of said rectangular sheet of material with each pair spaced longitudinally from another pair and with each bracket of a pair spaced transversely from the other bracket of the same pair, prior to said first forming operation; and
   h. attaching one of said conductor-supporting rods between each pair of said brackets, subsequent to said first forming operation.

2. The method of claim 1 in which said rectangular sheet is of metallic material and said attaching of the brackets comprises welding said brackets to said one surface of said rectangular sheet of metallic material; said attaching of said conductor comprises clamping said conductor to said rods; and said second forming operation is followed by attaching and sealing of said proximal edges together.

3. The method of claim 1 in which the attaching of said rods to said brackets comprises:
   a. placing flanged end connectors of said rods into slots of said brackets; and
   b. forming tabs of said brackets to retain said rods.

4. The method of claim 1 in which each said conductor-supporting rod includes a rod portion, a pair of flanged end connectors on the opposite ends of said rod portion, and a conductor-supporting saddle intermediate the ends thereof, the method of fabrication which comprises:
   a. molding said flanged end connectors to opposite ends of said rod portion; and
   b. molding said conductor-supporting saddle intermediate of said opposite ends.

5. The method of claim 1 in which said rectangular sheet is of metallic material and each said conductor-supporting rod includes a rod portion, a pair of flanged end connectors on opposite ends of said rod portion, and a conductor-supporting saddle intermediate the ends thereof, the method which comprises:
   a. molding said flanged end connectors to opposite ends of said rod portion;
   b. molding said conductor-supporting saddle intermediate of said flanged end connectors;
   c. said attaching of said brackets comprises welding said brackets to said one surface of said rectangular sheet of metallic material;
   d. said attaching of said rods to said brackets comprises placing said flanged end connectors into slots of said brackets, and forming locking tabs of said brackets to retain said rods;
   e. said attaching of said conductor comprises clamping said conductor to said conductor-supporting saddles; and
   f. said second forming operation is followed by welding of said proximal edges together.

6. The method of claim 5 in which said conductor is available in lengths at least twice as long as the available length of said elongated rectangular sheet, the method which further comprises:
   a. placing a second U-shaped structure having brackets at one end of a first assembly with the brackets of the second U-shaped structure in circumferential alignment with the brackets of the first assembly;
   b. attaching conductor-supporting rods between each pair of brackets in the second U-shaped structure;
   c. extending the conductor from the first assembly longitudinally through the second U-shaped structure and transversely over the supporting rods in the second U-shaped structure;
   d. clamping the conductor onto the supporting rods in the second U-shaped structure;
   e. forming the second U-shaped structure into a second closed conduit with the elongated edges of its sheet proximal to each other;
   f. welding said proximal edges; and
   g. welding the first assembly to said second closed conduit.

7. A pipeline and conductor assembly which comprises:
   a. a conduit of formed sheet construction having a closed and fluid-tight cross section;
   b. a conductor being longitudinally disposed in said conduit and maintained in spaced parallel relationship to the inner walls of said conduit;
   c. said assembly includes a plurality of rod-supporting brackets being attached to the inside of said conduit on oppositely opposing inner walls thereof, and forming longitudinally spaced pairs of brackets with each bracket located on a plane parallel to the longitudinal axis of said conduit and with each pair of brackets located on a transverse plane of said axis; each assembly includes a plurality of conductor-supporting rods, each having one end thereof attached to one bracket of one of said pairs and each having the other end thereof attached to the other bracket of said pair; and said brackets, said rods, and attaching of said conductor to said rods provides said maintenance of said spaced parallel relationship of said conductor to said inner walls; and d. each of said conductor-supporting rods comprises a rod portion and flanged end connectors connected to opposite ends of said rod portion; each of said brackets includes slotted plate means, being spaced from the inside surface of said conduit, for receiving one end of one of said flanged end connectors and for securing said rods by said flanged end connectors; and said attachment of said conductor-supporting rods comprises said flanged end connectors and said slotted plate means.

8. The assembly of claim 7 in which said rod-supporting brackets each comprises a hat-shaped channel structure having the flanges thereof welded to said conduit to provide said attachment of said brackets to said conduit, each having a rod-attaching plate which includes a rod-attaching aperture therethrough, and each including a pair of webs which maintain said plate in spaced relationship to the inside of said conduit.

9. The assembly of claim 8 in which said rod-attaching aperture comprises a slot extending from approximately the center of said plate outwardly transverse to one of said webs and extending therethrough; said bracket includes a second slot extending through said one web for a portion of the height thereof, being wider than the first said slot, and cooperating with the first said slot to form a T-shaped opening; and a pair of bendable locking tabs which comprise a pair of extensions of said plate, being spaced on both sides of first said slot, having an overall width which approximates the width of said second slot, and being bendable into said second slot.

10. The assembly of claim 7 in which each of said conductor-supporting rods comprises a rod portion of dielectric material, a pair of flanged end connectors each having both a hub portion and a flanged portion and each being molded to one end of said rod portion, a plurality of conductor-supporting saddles being molded to each of said rod portions in spaced relationship to each other and each having a longitudinally extending supporting and clamping portion; said brackets each comprise a hat-shaped channel structure having the flanges thereof welded to said conduit to provide said attachment of said brackets to said conduit, having a rod-attaching plate, and including a pair of webs which maintain said plate in spaced relationship to the inside of said conduit; said rod-attaching plate includes a slot extending from approximately the center of said plate outwardly transverse to one of said webs, extending therethrough, and having a width which slidably receives said hub portion; said one web includes a second slot extending through said one web for a portion of the height thereof, being wider than the first said slot, cooperating with the first said slot to form a T-shaped opening, and having a width and height which slidably receives said flanged portion; a pair of bendable locking tabs which comprise a pair of extensions of said plate, being spaced on both sides of said first slot, having an overall width which approximates the width of said second slot, and being bendable into said second slot; said conductor includes a plurality of conductors each being placed onto one of said supporting saddles; said attaching of said conductors comprises a plurality of clamps each clamping around one of said conductors and one of said longitudinally extending supporting and clamping portions; and said attaching of said conductor rods to said brackets comprises said flanged end connectors, said slots, and said locking tabs.

* * * * *